Oct. 10, 1950 G. DOWNING 2,524,896
AUTOMATIC LEADBURNING MACHINE
Filed June 14, 1948 4 Sheets—Sheet 1
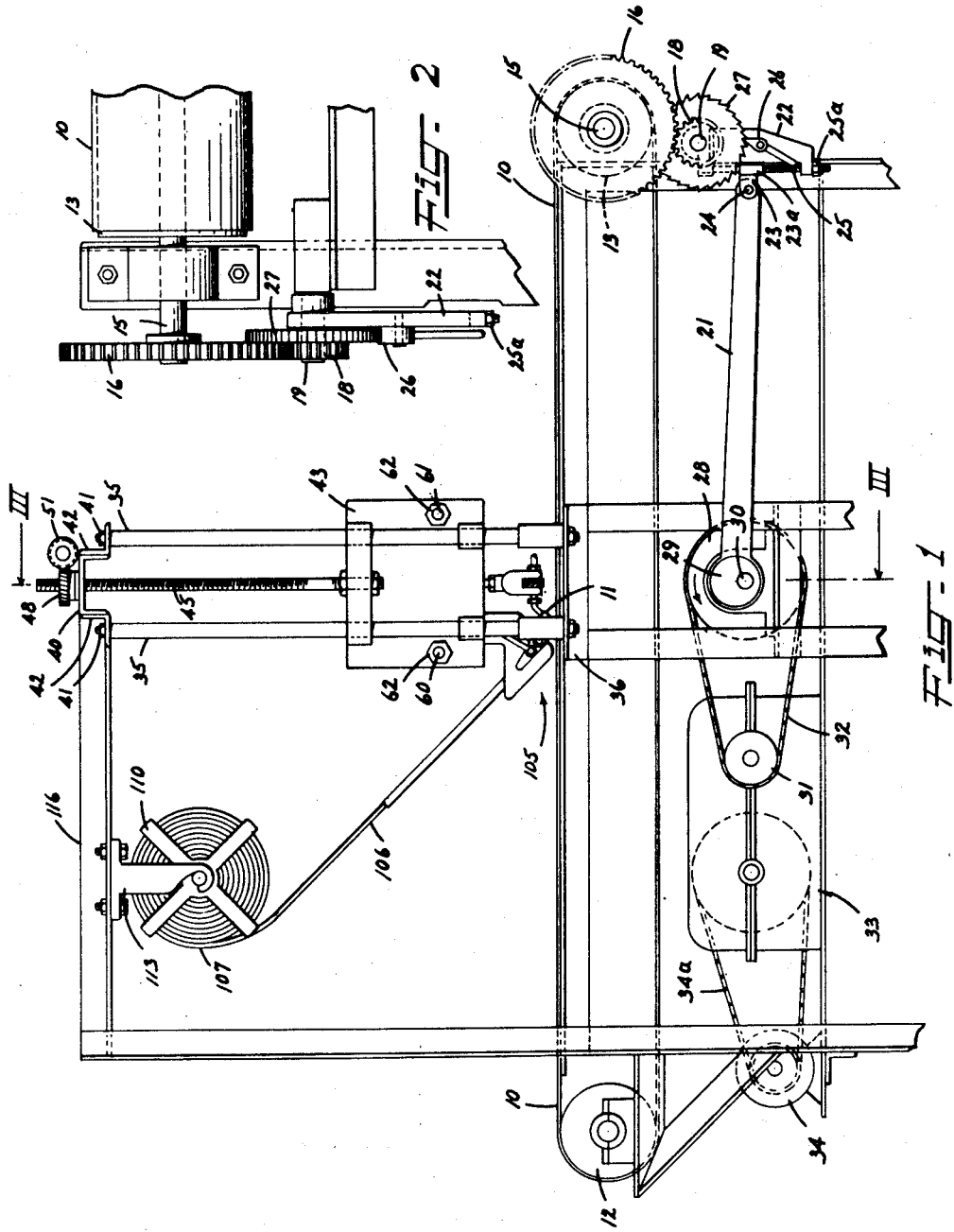
INVENTOR.
GEORGE DOWNING
BY
Thomas R. O'Malley

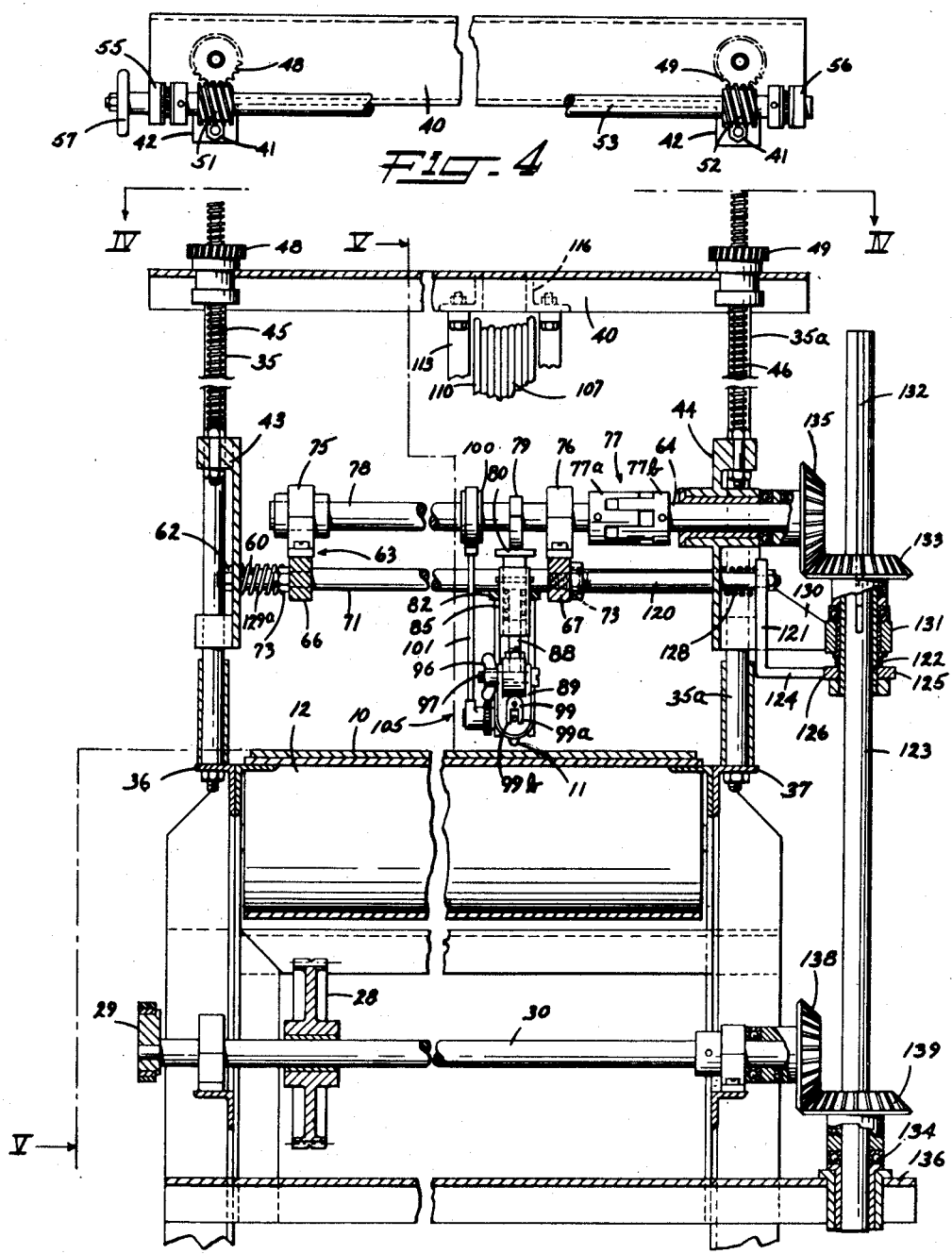

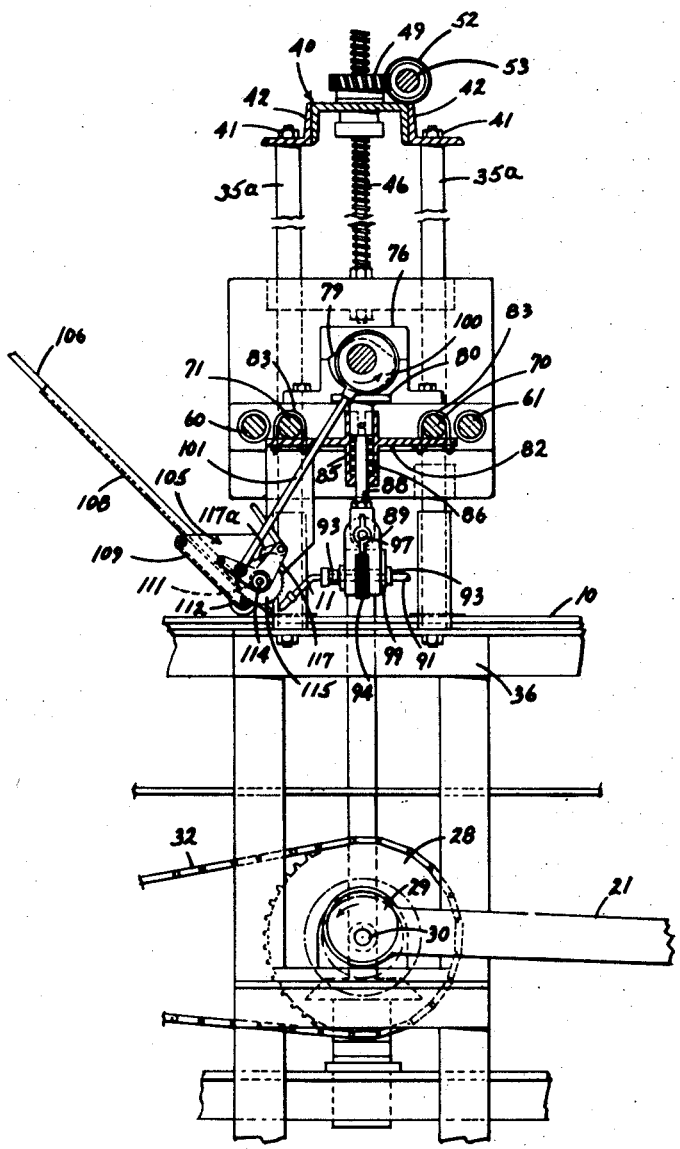

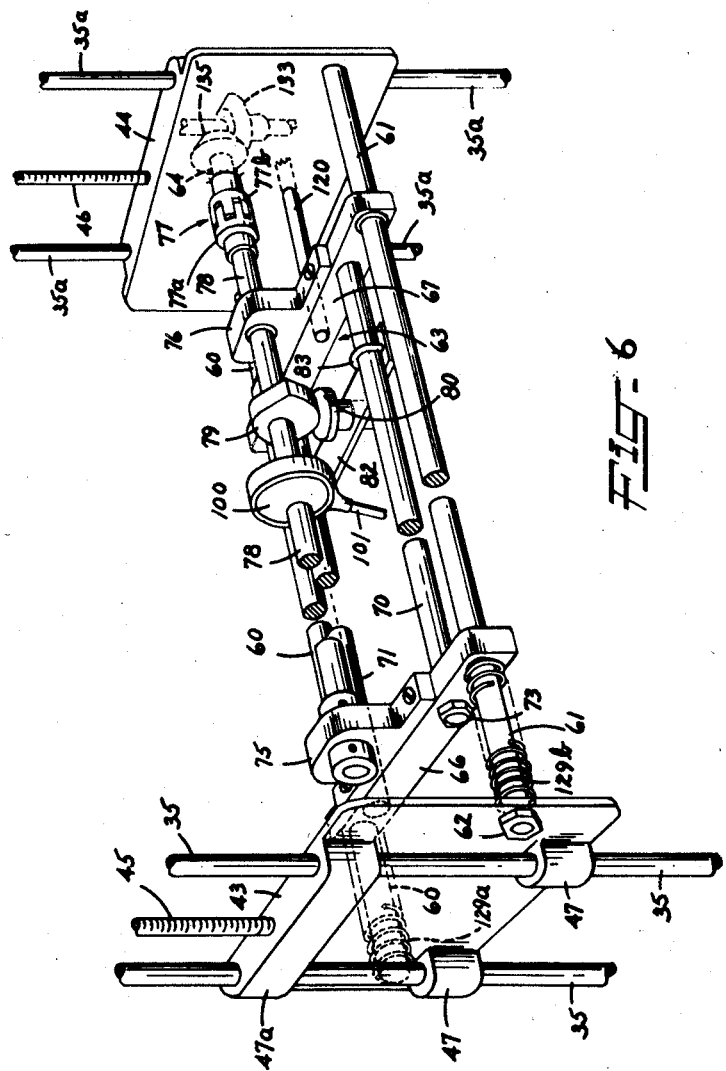

Patented Oct. 10, 1950

2,524,896

UNITED STATES PATENT OFFICE 2,524,896

AUTOMATIC LEAD-BURNING MACHINE

George Downing, Parkersburg, W. Va., assignor to American Viscose Corporation, Wilmington, Del., a corporation of Delaware Application June 14, 1948, Serial No. 32,821

9 Claims. (Cl. 113—59)

1

This invention relates to welding apparatus and particularly to a type adapted for automatic welding of metals having a low melting point such as lead or thermoplastic resins and the like. An important use to which the invention has been put is the preparation of welded joints of lead materials. It will be described therefore with reference to the process of the welding art known as lead-burning.

It is an object of this invention to provide an automatic machine for welding articles comprising fusible materials. It is a further object to provide an apparatus suitable for welding metals of low melting point such as lead or other non-metallic thermo-plastic materials with melting points or melting ranges of comparable temperatures. Another object is to provide a machine that may be used to weld variously shaped articles and to weld materials of various thicknesses. Other objects, features, and advantages will become obvious in the following description, and the drawing of the invention in which Fig. 1 is a side elevation of a welding machine according to a preferred embodiment;

Fig. 2 is a fragmentary view of a portion of the machine as seen from an end illustrating the drive for a work-carrying conveyor;

Fig. 3 is a shortened view of a transverse section of the machine taken along line III—III of Fig. 1;

Fig. 4 is a top view of the top portion of the machine as illustrated in Fig. 1;

Fig. 5 is a section view of the central portion of the machine taken along line V—V of Fig. 3; and Fig. 6 is a perspective view of the portion of the machine which supports the heating element and the fusible-rod feeding mechanism.

Briefly, the invention comprises a machine which carries work to be welded in intermittent motion along a path through a region of the machine in which welding is performed. A portion of the work is heated by an element of the machine which is reciprocated transversely to the direction of movement of the work, and pulled away from the work during the movement thereof. A fusible rod is supplied intermittently by a portion of the machine which feeds the rod toward the heated portions of the work whereupon a small portion of the rod is melted and received by the work during a portion of the period during which the heating element is pulled away from the work.

Fig. 1 illustrates a welding machine according to the invention equipped with an endless belt 10

2 which functions as a conveyor for transporting materials to be welded in intermittent motion past a burner 11 supported immediately above the approximate center of the region traversed by the belt. The belt 10 is supported on rolls 12 and 13; shaft 15 supports the roll 13 fixed thereto and a gear 16 secured thereon. The belt 10 is given intermittent motion in a direction to the right as viewed in Fig. 1 by intermittent rotation of the gear 16 imparted to it by an intermeshing gear 18 fixed on a shaft 19.

Shaft 19 also supports a ratchet wheel 27 keyed or otherwise fixed thereto and a lever 22 which may pivot freely about the shaft 19. Pivotably supported on the lever 22 is a pawl 26 which engages the toothed periphery of the wheel 27 so that when the lever 22 is swung in a counter-clockwise direction, the wheel 27, shaft 19 and the gear 18 are turned with it. However, when the lever is swung in a clockwise direction, the pawl 26 merely slips over the teeth and no movement of the wheel 27 or parts connected therewhich occurs.

The lever 22 is oscillated by a reciprocable connecting rod 21 so that the degree of angular movement of the lever 22 may be varied to obtain advancements of various lengths of the belt 10. The lever 22 is provided with an adjustable arrangement for changing the effective lever length of the lever 22 comprising a threaded element 25 rotatably supported along one side of the lever 22 and which extends through a complementarily threaded portion 23a of a clevis-like member 23. Loosening of the nut 25a and turning of the element 25 results in longitudinal movement therealong of the clevis member 23, whereby the effective lever arm length as measured from a pin 24 extending through the clevis member 23 and the end of the connecting rod 21, to the axis of shaft 19 may be varied. Connecting rod 21 is reciprocated by a cam or eccentric 29 fixed to a shaft 30. The shaft 30 is rotated by a conventional driving means such as the chain 32 passing around a sprocket 28 fixed on the shaft 30 and a driving sprocket 31 of a conventional gear reduction unit 33 which may be connected with a power source such as the motor 34 by any convenient arrangement such as the chain drive 34a shown in Fig. 1.

A device 105 for feeding a fusible rod 106 into the region heated by the burner 11 and a mechanism for supporting and oscillating the burner and the device are supported above the work traversing region of belt 10. For suitable support, vertical rods 35 and 35a are provided midway along opposite sides of the belt-traversing area of the machine. The rods 35 extend upward from the brackets 36 and 37 which form a part of the machine frame. A channel member 40 extends transversely of the machine between the top ends of bars 35 and 35a and is secured to the upper threaded portions thereof by nuts 41 and angle irons 42.

Bars 35 and 35a serve as vertical guides for slide plates 43 and 44 respectively, each of which has suitable apertured portions such as elements 47 and 47a of plate 43, through which the bars may extend. The slide plates 43 and 44 are adjustably suspended on threaded lift bars 45 and 46. The height of slide plates 43 and 44 above the plane of the belt 10 may be simultaneously adjusted by rotation of round nuts 48 and 49. The nuts 48 and 49 each have a toothed peripheral section which mesh with gears 51 and 52 respectively fixed on the shaft 53. The shaft 53 is supported along the transverse member 40 in bearings 55 and 56 attached thereto. The shaft 53 may be rotated by manually gripping and turning the hand pulley 57 to obtain simultaneous elevating or lowering of side plates 43 and 44.

Side plates 43 and 44 are rigidly inter-connected by rods 60 and 61 terminating in threaded ends which project through the plates and are secured thereto by nuts 62. The slide plates 43 and 44 and inter-connecting rods 60 and 61 constitute a support frame for a carriage 63, best shown in Fig. 6 which directly supports the fusible rod feeding device 105, the burner support, and a cam shaft 78. Slide plate 44 is apertured at a point mid-way between rods 35a for extension therethrough of a rotatable shaft 64. Rods 60 and 61 provide a guiding surface upon which a structure for supporting the burner mechanism may reciprocate, such as the carriage 63, so that the burner 11 may execute a movement transverse to the travel of the work needed to heat the work supported upon the belt 10. Slide bars 66 and 67 are elements of the carriage 63, each of which is suitably apertured at both ends for extension therethrough of the rods 60 and 61. Slide bars 66 and 67 in their normal relationship within the machine extend substantially parallel to the plane of the belt 10 and in a direction parallel to the direction of movement of the belt 10, and slide freely upon the bars 60 and 61. Bars 66 and 67, however, are rigidly interconnected to form a unitary structure for supporting the burner mechanism, by rods 70 and 71, each which has threaded ends which extend through the slide bars 66 and 67 and are rigidly secured therewith by means such as nuts 73. On the central portions of the upper surfaces of the bars are secured bearings 75 and 76. Cam shaft 78 extends through the bearings in alignment with shaft 64. Rotative movement is transmitted to shaft 78 from shaft 64 by means of a coupling 77. In operation shaft 78 undergoes a small axial displacement caused by the reciprocation imparted to the carriage 63. Coupling 77 is of a conventional type permitting such axial displacement of the shaft 78 relative to shaft 64 while transmitting rotation between the shafts.

As shown in Fig. 3, the coupling 77 comprises members 77a and 77b having interdigitating fingers. Member 77a is secured to the end portion of shaft 78 and its fingers slide along the fingers of member 77b during axial movement of the shaft 78. Thus the shaft 78 may undergo lengthwise reciprocative movement while being rotatively driven by the shaft 64. Other types of conventional slip couplings (not shown) may be used however, such as the type in which one member of the coupling has an annular externally toothed periphery which meshes within the internally toothed section of the other member, or the type in which one of the shafts, such as the shafts 64 and 78 would have an axial interiorly splined recessed end portion which fits over a complementarily exteriorly splined portion of the other shaft.

On shaft 78 are fixed cams which impart independent reciprocative movements to the heating element 11 and the rod feeding device 105, in addition to the reciprocative movement which they undergo by being supported on the carriage 63. The cam 79 operates a plunger 80 supported by a bracket 82 fastened to the rods 70 and 71 by U-bolts 83. A vertical cylindrical housing 85 forming the central portion of the bracket 82, acts as a guide for the plunger 80 and a housing for the spring 86 which urges the plunger in a vertical direction against the cam 79. Extending vertically downwardly from the plunger 80 is a rod 88. Affixed to the lower end of the rod 88 is a universally adjustable swivel fixture 89.

A tubular fuel conducting portion 91 of the burner extends through a threaded sleeve member 93 extending through the fixture 89 in a direction generally parallel to the plane of the belt 10. Sleeve 93 also extends in a threaded relationship through a knurled nut 94 which is retained within a complementary recess therefor in the fixture 89. Manual twisting of the nut 94 results in longitudinal shifting of the position of sleeve 93 and likewise the burner 11 supported therethrough in a direction parallel to the direction of the movement of the belt 10. The burner may be tilted by loosening a butterfly nut 96 on the bolt 97 which serves as a pivot through the fixture 89. A clevis-like protrusion 99 on the lower portion of fixture 89 engages flat surfaces on diametrically opposite sides of the sleeve 93 along the inner surface of its fingers 99a and 99b to prevent turning of the element within the fixture 89 while turning the nut 94.

The eccentric 100 reciprocates the connecting rod 101 which drives a pawl-ratchet wheel mechanism on the rod feeding device 105. The fusible rod 106 is supported in an inclined tube 108 fixed to a bracket 109 attached to the carriage 63. The rod 106 may be inserted into the device in short lengths of several feet or it may, as a preferable arrangement such as shown in Fig. 1, be withdrawn from a reel 110 containing a coil 107 of said rod. The reel 110 is supported by a bracket 113 suspended from a portion 116 of the machine frame. The rod is held by the two rollers 111 and 112 near its lower end. Roller 111 is fixed to a pin 114 to which is also fixed a ratchet wheel 115. Reciprocation of link 101 produces oscillatory pivoting movement of a pawl support lever 117 about the pin 114. The pawl lever 117 when moved in an anti-clockwise direction causes a pawl 117a supported thereon to engage the ratchet wheel 115 and to rotate it. The roller 111, in frictional contact with rod 106, is turned and the rod is moved lengthwise toward the work.

The burner 11 and the rod feeding device 105 are shown in close proximity to the belt 10 in Fig. 1 in such a position as would be desirable in the welding of flat plates. However, the machine is capable of welding work of various shapes and thicknesses and the welds to be made on such work may be at a level well above the surface of the belt 10. In this event, the vertical position of the burner and the rod-feeding mechanism is changed by elevating the entire assembly supported by the threaded lifting rods 45 and 46, by rotating shaft 53, thereby causing advancement of the lift rods through the round nuts 48 and 49.

To provide means for reciprocating the assembly comprising the carriage 63, the cam shaft 78, the burner, and the rod feeding assembly longitudinally of the rods 60 and 61, one end of a push rod 120 is secured to the slide bar 67 of the carriage 63. The other end is secured to an angular bracket 121 having an end portion 124 bearing against a cam 125 supported on a sleeve 122 secured on an upright shaft 123. To keep the bracket 121 constantly in contact with the cam surface 126, a spring 128 is provided along a portion of the push rod 120 extending between a portion of the side plate 44 and the bracket 121 tending to urge the rod 120 and carriage 63 to the right as viewed in Fig. 3. The movement of carriage 63 to the right may be further aided by other resilient means such as springs 129a and 129b supported by extension therethrough of the rods 60 and 61 between the slide plate 43 and slide bar 66.

A lateral extending portion 130 of the slide plate 44 supports a bearing 131 for the vertically extending shaft 123. Shaft 123 is provided with a spline 132 for a length equal to the vertical adjustment range of the lift rods 45 and 46 so that as the slide plates 43 and 44 are adjusted upwardly, a gear 133, the bore thereof adapted to fit the splined portion of shaft 123, slides upwardly along shaft 123 as a result of lifting action exerted on it through plate extension 130 and bearing 131, and remains in mesh with gear 135.

A lower portion of the shaft is supported in a bearing 134 capable of receiving axial as well as radial loads. The bearing 134 is secured to the machine frame member 136. A bevel gear 139 secured to the shaft 123 meshes with a bevel gear 138 secured on the shaft 30. In the embodiment shown in the drawing, the shaft 30 is normal to the shaft 123. By the action of the eccentric or cam 29 on the shaft 30, and the connecting rod 21 on apparatus already described, intermittent motion is imparted to the belt 10. The sizes of the gears 138, 139, 133 and 135 are so related that the shaft 178 makes one revolution for each revolution made by the shaft 30. The selection of these gears may also be such that shaft 123 makes one revolution for each revolution made by shafts 78 and 30. When this is the case, all reciprocating members of the machine undergo the same number of cycles per minute; the belt 10 performs a like number of intermittent advancements per minute. However, the cams may be adjusted relatively to one another to obtain any cyclic relationship desired in a sequence of movements performed by the belt 10, the burner 11 in vertical movement, the rod feed device 105 in advancing the rod 106, and the carriage 63 in its movement transversely of the belt 10.

This machine as herein described, closely simulates operations normally executed by a workman when making welded lead joints by hand equipment. In leadburning, a preferred procedure, assuming the work has been heated, is to bring the lead rod 106 into immediate proximity of the edges of the work to be joined at an angle of 30° to 60° with the plane of the work. The burner 11 is moved toward the position of the work immediately under the end of the rod so that the flame discharged therefrom strikes the rod at an angle which may vary from 60° to 90°. The angle of the flame with the plane of the work may satisfactorily vary between 45° and 90°. In the embodiment illustrated in Fig. 1, the rod approaches the belt 10 or the plane of the work at an angle of approximately 45°, and the flame of the burner 11 is aimed at the belt at an angle of approximately 90° with the rod 106 and 45° with the belt 10. The burner while close to the work undergoes sidewise motion imparted to it by reciprocating movement of the supporting carriage 63. The flame of the burner passes across the lower end of the rod 106 and causes a small portion of the rod to be melted, which drops from the rod into the space between edges of the work which have also been heated by the flame and have reached a molten or nearly molten condition. The work has remained stationary during these operations but as the burner starts to move away from the plane of the work, the belt 10 starts to move. During the period in which the burner moves away from and again approaches the work, the belt completes its movement which advances the work any desired distance. A satisfactory range for work advancement is $\frac{1}{8}$ to $\frac{3}{8}$ of an inch. Coinciding with the period during which the work is advanced and the burner is moved away from and back toward the work, the rod 106 is moved lengthwise toward the work by operation of the eccentric 100, connecting rod 101, and the ratchet mechanism connected thereto. The machine is now ready to perform another cycle comprising the movements just described. Fig. 5 illustrates a desirable time relationship for the cams 29, 79 and 100, for obtaining movement of the various parts of machine according to sequence above described. The position of cam 125 as shown in Fig. 3, whereby the carriage 63 is forced into the extreme right portion of its reciprocatory ambit, is a position coinciding in satisfactory time relationship with the position of the cams 29, 79 and 100 shown in Fig. 6.

The moving parts of the machine, as shown in the drawing, are set in a preferred timed relationship applicable to a lead burning operation. Shafts 30 and 78, as seen in Fig. 5, are turning in a counter-clockwise direction. If the machine is assumed to be operating and the positions of the parts at the beginning of the operating cycle for the machine are those shown in the drawings wherein the burner is midway through a period of immobility during which it is closest to the work; the connecting rod 101 is half-way along its upward path during which it slips the pawl over the teeth of the ratchet 115 of the rod feeding device for a fresh grip on the ratchet; the connecting rod 21 which drives the belt-moving mechanism is half way through its stroke for returning the pawl 26 for a fresh grip on the ratchet 27; and the carriage 63 is in its farthest position to the right as seen in Figs. 3 and 5. When the operating sequence of the machine is advanced one-quarter of a cycle, shafts 30, 78 and 123 have turned counter-clockwise through one-quarter of a revolution, the burner is still in its lowest position but about to start upward; the connecting rod 101 has reached its most retracted position for a fresh grip on the ratchet 115; the connecting rod 21 has been moved to its farthest position to the left in Fig. 5 and is now ready to start to the right whereupon the pawl 26 will engage the ratchet 27 and cause movement of the gears 18, 16 and the belt 10; and the carriage 63 is midway through a transverse movement to the left as seen in Fig. 3. At the half cycle, the burner 11 has been raised to its most remote position from the belt 10 and is about to start a downward movement lasting a quarter of a cycle; link 101, forced downward by the cam 100, is halfway through the downward stroke whereby rod 106 is moved lengthwise toward the work; connecting rod 21 is halfway through its stroke to the right whereby the belt 10 has moved halfway through a single advancement of intermittent motion; and the carriage 63 has reached the extreme left position as seen in Fig. 3 and is about to start to the right. At three-quarters of the cycle, burner 11 has again reached its lowest position; link 101 has reached its lowest position and the movement of the rod 106 toward the work has been completed for one cycle; the connecting rod 21 has reached its position farthest to the right as seen in Fig. 5 and is about to start to the left and movement of the belt has been completed for one cycle; and carriage 63 is midway over the belt 10 in its transverse movement to the left. At the completion of the cycle, the parts are in the positions described at the beginning of the cycle and the sequence of movements will be repeated as hereinbefore described.

While the invention herein described came about through efforts to satisfy the need for an efficient automatic lead burning apparatus, it is readily adaptable to the welding of other materials. On account of the burner lifting mechanism included as a part of the machine herein described, such welding apparatus is particularly useful in welding other readily fusible materials such as other metals, metal alloys or plastic resins. In the event an open flame has a deleterious effect on the material to be welded, substitution for a burner using a combustible fuel may be made by providing a heating element using superheated steam, heated air, nitrogen or other gas, or a heat wave radiating device, or high frequency electrical heating equipment. The machine may be adapted also to welding higher melting metals such as steel and copper by such expedients as changing the phase interrelationships of the cams or the contours thereof without substantially changing the machine, or by substituting different fuels for use in the burner. Hydrogen is normally used as fuel for lead burning whereas acetylene may be used for welding steel.

While a preferred embodiment of the invention has been described and shown, it is to be understood that changes in shape, size, and rearrangement of details and parts such as come within the purview of the invention claimed, may be resorted to.

What is claimed is:

1. A machine for welding comprising a driving means, a movable work-carrying belt, rolls for supporting the belt, a connecting-rod, ratchet and pawl mechanism connecting the driving means and at least one of the rolls for producing intermittent rotation thereof, a flame-producing heating element, adjustable means for supporting the element over the belt, a cam reciprocator for the element producing movement thereof transversely to the direction of movement of the belt, a cam reciprocator for the element connected with the driving means in timed relationship for moving the element away from the belt in a direction normal to its work carrying surface and for returning the element to a nearer position during motionless periods of the belt, a pawl and ratchet device for feeding fusible rod toward a region of the work heated by the element, adjustable means for supporting the device over the belt, gear and shaft means connecting the reciprocators and device with the roll driving means in timed relationship with the mechanism for driving the belt.

2. A machine as in claim 1 in which the adjustable supporting means for the heating element and the fusible rod feeding device comprises parallel members extending vertically from opposite sides of the portion of the machine traversed by the belt, a transverse elongate member secured to oppositely disposed members, a vertically adjustable frame suspended between and slidably attached to oppositely disposed members, reciprocable means supported on the frame for supporting the heating element and the rod feeding device, lifting means dependent from the transverse elongate member for raising and lowering the frame.

3. A machine as in claim 1 in which the adjustable supporting means for the heating element and the fusible rod feeding device comprises parallel members extending vertically from opposite sides of the portion of the machine traversed by the belt, a transverse elongate member secured to oppositely spaced members, a vertically slidable frame suspended between and slidably attached to oppositely spaced members, reciprocable means supported on the frame for supporting the heating element and the rod feeding device, a threaded member fixed to the frame extending vertically through the elongate member, a complementarily threaded element for threadably engaging the threaded member having a lower surface adapted for bearing on an upper surface of the transverse elongate member, and means for turning the threaded element.

4. A machine as in claim 1 in which the adjustable supporting means for the heating element and the fusible rod feeding device comprises a plurality of upright bars disposed at opposite sides of the belt traversing region of the machine, a transverse elongate member secured at opposite ends to the tops of oppositely disposed bars, a vertically adjustable frame comprising two vertical slide plates attached slidably to oppositely disposed bars, at least a pair of parallel rods extending transversely of the machine from one plate to the other and secured to the plates, a laterally sliding frame reciprocable upon the rods of the vertically sliding frame comprising two approximately parallel end members extending between the rods and suitably apertured to extend around the rods and be slidable thereupon, bridging means extending transversely of the machine between the end members and secured thereto, a shaft extending transversely of the machine and rotatably supported in the end members, separate cam means on the shaft for vertically reciprocating the heating element and operating the pawl and ratchet fusible rod feeding device, a pair of threaded rods secured to and extending vertically from each side plate and through the transverse elongate member, rotatable nuts for threadably engaging the threaded rods, having lower surfaces adapted for bearing upon the elongate member, and means for simultaneously turning the nuts.

5. A machine for welding comprising a movable work-carrying member, means for intermittently driving the member, a device for feeding a fusible rod to the work, an element for heating the work and melting the rod, means for supporting the device and the element over the work, means for reciprocating the supporting means in a direction extending transversely of the direction of movement of the member and parallel to the surface of the work carried by the member, means for reciprocating the element relative to the supporting means toward and away from the work-supporting surface of the member, and means for interconnecting both of said reciprocating means and said intermittent driving means for operating the reciprocating means in cyclical timed relationship with the movement of the work-carrying member.

6. A machine for welding comprising a movable work-carrying member, means for intermittently driving the member, a device for feeding a fusible rod to the work, an element for heating the work and melting the rod, a carriage for supporting the device and the element over the work, means for reciprocating the carriage in a direction transversely of the direction of movement of the member parallel to the surface of the work carried by the member, means supported on the carriage for reciprocating the element in a direction toward and away from the work-supporting surface of the member, and means for driving the rod-feeding device, means for interconnecting both of said reciprocating means and both of said driving means for operating them in cyclical timed relationship.

7. A machine for welding comprising a movable work-carrying member, means for intermittently driving the member, a device for feeding a fusible rod to the work, an element for heating the work and melting the rod, a carriage for supporting the device and the element over the work, means for reciprocating the carriage in a direction transversely of the direction of movement of the member parallel to the surface of the work carried by the member, means supported by the carriage for reciprocating the element in a direction toward and away from the member, supporting means for the carriage adjustable in a direction toward and away from the work-carrying surface of the member, means supported by the carriage for driving the rod-feeding device, means for interconnecting both of said reciprocating means and both of said driving means for operating them in cyclical timed relationship with the movement of the work-carrying member.

8. A machine for welding comprising a movable work-carrying platform, means for intermittently driving the platform, a carriage, a device on the carriage for feeding a fusible rod to the work, means on the carriage for intermittently driving the rod-feeding device, an element on the carriage for heating the work and melting the rod, means for reciprocating the carriage in a direction transversely of the direction of movement of the platform parallel to the surface of the work carried by the platform, means supported by the carriage for reciprocating the element relative to a carriage in a direction toward and away from the platform, and means for interconnecting both of said reciprocating means and both of said driving means for operating them in cyclical timed relationship.

9. A machine for welding comprising a work-carrying belt, rolls for supporting the belt, means for intermittently driving at least one of the rolls, a device for feeding a fusible rod to the work, means for intermittently driving the device, an element for heating the work and melting the rod, a carriage for supporting the element and the device, means for reciprocating the carriage in a direction extending transversely of the direction of movement of the belt parallel to the surface of the work carried by the belt, means supported on the carriage for reciprocating the element in a direction toward and away from the belt, and means for interconnecting both of said reciprocating means and both of said driving means for operating them in cyclical timed relationship.

GEORGE DOWNING.

REFERENCES CITED

The following references are of record in the file of this patent:

UNITED STATES PATENTS

| Number | Name | Date |
| --- | --- | --- |
| 1,493,035 | Gueritey | May 6, 1924 |
| 1,878,136 | Hasse | Sept. 20, 1932 |
| 2,110,529 | Rossignol | Mar. 8, 1938 |
| 2,267,296 | Bennewitz | Dec. 23, 1941 |
| 2,394,467 | Muller | Feb. 5, 1946 |